US008538396B2

(12) United States Patent
Couse et al.

(10) Patent No.: US 8,538,396 B2
(45) Date of Patent: Sep. 17, 2013

(54) WIRELESS EXTENSIONS FOR A CONFERENCE UNIT AND METHODS THEREOF

(75) Inventors: Peter Francis Couse, Ottawa (CA); Jim Davies, Amprior (CA)

(73) Assignee: Mitel Networks Corporaton, Ottowa, Ontario (CA)

( * ) Notice: Subject to any disclaimer, the term of this patent is extended or adjusted under 35 U.S.C. 154(b) by 152 days.

(21) Appl. No.: 12/807,436

(22) Filed: Sep. 2, 2010

(65) Prior Publication Data

US 2012/0058754 A1    Mar. 8, 2012

(51) Int. Cl.
*H04M 3/42* (2006.01)

(52) U.S. Cl.
USPC .......... 455/416; 455/41.2; 455/421; 455/519; 455/575.2

(58) Field of Classification Search
USPC ..... 455/416, 569.1, 575.2, 41.2; 379/202.01; 370/260
See application file for complete search history.

(56) References Cited

U.S. PATENT DOCUMENTS

| 7,925,288 | B2 * | 4/2011 | Kim | 455/518 |
|---|---|---|---|---|
| 8,229,487 | B2 * | 7/2012 | Kaida | 455/518 |
| 8,233,930 | B1 * | 7/2012 | Dawson et al. | 455/519 |
| 2003/0045275 | A1 * | 3/2003 | McDonagh et al. | 455/414 |
| 2003/0072421 | A1 * | 4/2003 | Hosomi | 379/67.1 |
| 2003/0110399 | A1 * | 6/2003 | Rail | 713/202 |
| 2004/0116130 | A1 * | 6/2004 | Seligmann | 455/456.1 |
| 2004/0224710 | A1 * | 11/2004 | Koskelainen et al. | 455/518 |
| 2005/0197061 | A1 * | 9/2005 | Hundal | 455/41.2 |
| 2005/0271194 | A1 * | 12/2005 | Woods et al. | 379/202.01 |
| 2006/0003784 | A1 * | 1/2006 | Chion et al. | 455/518 |
| 2006/0116075 | A1 * | 6/2006 | Gallo | 455/41.2 |
| 2007/0097886 | A1 * | 5/2007 | Schwagmann et al. | 370/260 |
| 2007/0281723 | A1 * | 12/2007 | Chotai et al. | 455/518 |
| 2008/0200159 | A1 * | 8/2008 | Lai | 455/416 |
| 2009/0081999 | A1 * | 3/2009 | Khasawneh et al. | 455/416 |
| 2009/0111443 | A1 * | 4/2009 | Gupta | 455/416 |
| 2009/0240770 | A1 * | 9/2009 | Kalipatnapu et al. | 709/204 |

FOREIGN PATENT DOCUMENTS

| EP | 2056576 A1 | 5/2009 |
|---|---|---|
| FR | 2884673 A1 | 10/2006 |
| FR | 2884673 A1 | 10/2006 |

\* cited by examiner

*Primary Examiner* — Sharad Rampuria

(57) ABSTRACT

A telecommunication conference device, system and method for enhancing participation within a conference call. The present application relates to telecommunications, and more particularly, to a conference phone capable of being connected with wireless devices such that they can be used as microphone extensions. In one embodiment, the conference phone can include a wireless interface and a microphone. The conference phone can connect with one or more wireless devices through the wireless interface. The conference phone can receive audio from the one or more wireless devices and at the same time, can receive audio from the microphone on the conference phone. The audio received by the conference phone, through the one or more wireless devices and the microphone, can be combined into a single audio stream using an audio mixer. The teleconference phone can remove echoing effects that are within the audio stream and then transmit the audio over a telephone network.

19 Claims, 5 Drawing Sheets

WIRELESS EXTENSIONS FOR A CONFERENCE UNIT AND METHODS THEREOF

TECHNICAL FIELD

This application generally relates to conference phones, and more particularly, to connecting wireless devices to a conference phone such that the wireless devices can be used as microphone extensions.

BACKGROUND

Specialized phones, called conference phones, are used when several people in a meeting room want to hold a voice call with one or more persons at another location. A conference phone typically has one speaker and a series of microphones that provide audio pickup 360 degrees around the unit. Through conference calls, meetings or presentations can be provided across different locations. Conference calling is viewed as a primary means of cutting travel costs and allowing workers to be more productive by not having to go to out-of-office for meetings.

Nonetheless, a typical issue associated with conference phones is picking up audio of participants in a room who are not close to the conference phone, for example, in a large board room. To overcome these challenges, manufacturers of conference phones have provided the ability to plug extension microphones into the base phone to extend the reach of the audio pickup of the conference phone. These extension microphones are generally connected to the base phone by long wires, which often run along the tabletop causing clutter. Commonly, the microphones have to be moved around so the participants on the far end of the call can hear the speaker. This requires managing the wires connecting the microphones, which often are not long enough to reach the person speaking.

In other instances where the room might be crowded, participants might not be able to sit at the table where they would be close to the conference phone microphones. As a result, the participants are too far away from the conference phone to be heard by the participants on the far end of the conference call. Because they are not at the conference table, it is difficult to get an extension microphone to a location that would allow them to be heard.

A need therefore exists for solving the problem of providing audio pickup in large conference rooms. The present application addresses these issues encountered in conference phones and provides other, related advantages.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

The present application generally relates to telecommunications, and more particularly, to a conference phone capable of being connected with wireless devices such that the wireless devices can be used as microphone extensions. In an illustrative embodiment, the conference phone can include a wireless interface and a microphone. The conference phone can connect with one or more wireless devices through the wireless interface. The conference phone can receive audio from the one or more wireless devices and at the same time, receive audio from the microphone on the conference phone. The audio received by the conference phone, through the one or more wireless devices and the microphone, can be combined into a single audio stream using an audio mixer. The teleconference phone can remove any undesirable effects, such as echoes, that are within the audio stream before transmitting it over a telephone network.

Numerous advantages can be provided through the conference phone briefly described above. Current phones do not provide the ability to receive audio when participants are far away from the microphones located on the conference phone. Through the microphone extensions provided herein, enhanced participation by users within a meeting can be established. Those users can sit anywhere in a room, even in a large meeting hall where the users cannot see each other, and still be heard by the end participants of a conference call. Furthermore, the conference phone described herein can remove the need for wires in current microphone extensions. In addition to the embodiment described above, numerous other features regarding the conference phone will now be presented.

Operating Environment

Figure 1:
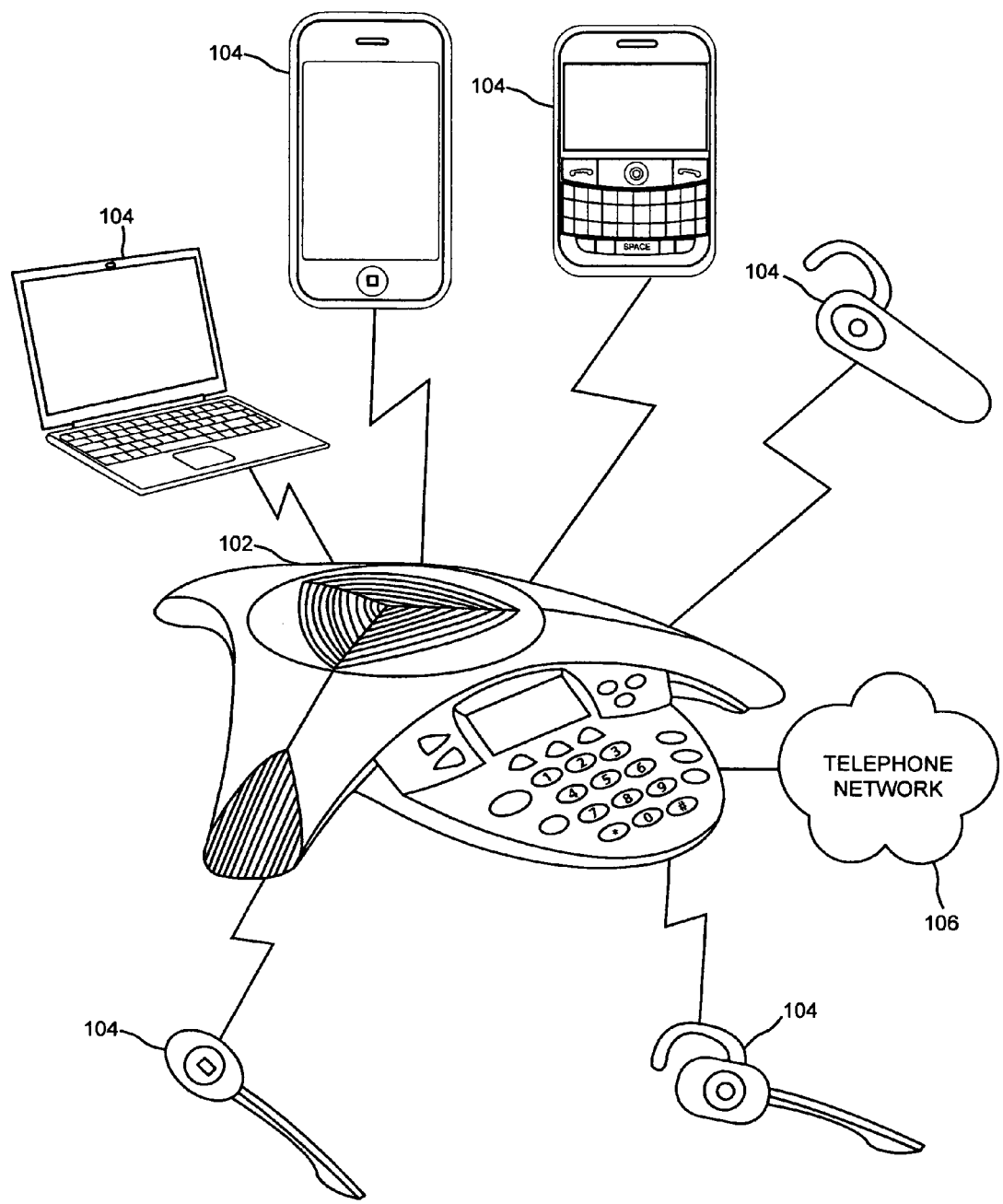
FIG. 1 is a typical environment showing wireless devices interacting with an exemplary conference phone in accordance with one aspect of the present application.

Turning now to FIG. 1, a typical environment showing wireless devices 104 interacting with an exemplary conference phone 102 in accordance with one aspect of the present application is provided. The operating environment can incorporate a conference phone 102 and multiple wireless devices 104. Within the environment is a telephone network 106 that can be coupled to the conference phone 102. Known to those skilled in the relevant art, fewer or more components can be present in the environment.

The wireless devices 104 within the environment can be commonly used apparatuses that are capable of transmitting the audio to the conference phone 102, for example, headsets. Increasingly, headsets are becoming used as they are often required in "hands free" States. Other types of wireless devices 104 that can be used include cellular phones, smartphones, etc. While these devices 104 can transport data, it can also be realized that in some applications these devices 104 can also provide audio to local receivers such as the conference phone 102. In one embodiment, as shown within FIG. 1, a laptop 104 or other computing device can be used. The computer device 104 can incorporate software that allows audio to be captured and provided to the conference phone 102. As long as the wireless devices 104 support the transmission of audio, it can generally be used as a microphone extension to the conference phone 102.

The wireless devices 104 can be used as microphone extensions. In one embodiment, the wireless devices 104 can communicate with the conference phone 102 using Bluetooth™ technology. Bluetooth™ technology can provide wireless control of communications between two parties when the two parties are located within proximity of each other. In one embodiment, communications can be initially set up by pairing the wireless devices 104 and conference phone 102. A Bluetooth™ wireless interface on the conference phone 102 can allow for the connection of standard Bluetooth™ wireless headsets 104 such as those provided for use with cell phones. Manufacturers of these headsets can include Jabra®, Plantronics®, Motorola®, etc.

By pairing the wireless devices 104 with the conference phone 102, participants who are out of audio range of the built-in microphones of the conference phone 102 can be heard by participants at the other end of a conference call. Furthermore, participants can be anywhere in a room greatly enhancing the flexibility and performance of the conference phone solution. A GUI menu selection/pairing button on the conference phone 102 and the wireless device 104 can be pressed to put them into pairing mode. This can be done prior to a call being placed on the conference phone 102 or after a call has been established.

It should be understood that the embodiment described above is not the only form of allowing communications between the wireless devices 104 and the conference phone 102. In one embodiment, the wireless devices 104 and conference phone 102 can be set up to recognize each other without going through typical pairing procedures. A database storing information can be used to keep track of known wireless devices 104 that can be wirelessly connected with the conference phone 102. This information can be kept from previous pairings with this or another conference phone 102 or provided by an administrator or some other authorized personnel. The conference phone 102 can remember recent connections to allow automatic pairing of repeat users. This can provide an expedited log-in procedure removing the need for entering in a password. This application can be particularly valuable in personal office applications. When the user of the wireless device 104 enters into a room, the conference phone 102 can automatically recognize the wireless device 104 and connect the device 104 so it can start receiving audio from the conference phone 102.

Also depicted within FIG. 1, the conference phone 102 can be connected to a telephone network 106. The telephone network 106 can be a fixed line network, wireless network, or public network. Typically, the fixed line network can be directly wired into a single telephone exchange, often referred to as a public switched telephone network. The wireless network can provide coverage for mobile communications. The telephone network 106 can also be a private network which is closed to a group of telephones and connected to each other. A gateway can be used to reach other phones that are not within the private network.

Figure 2:
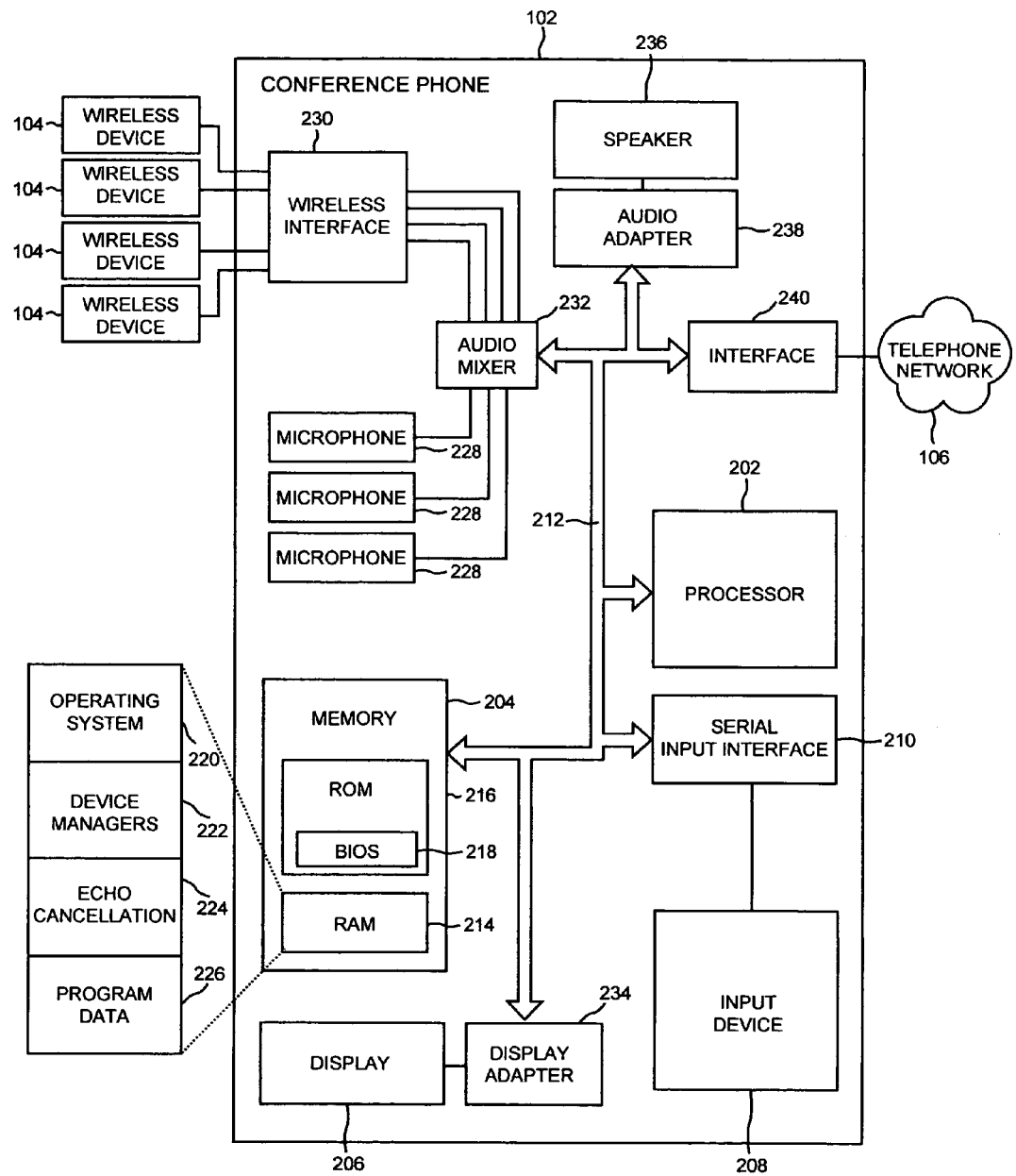
FIG. 2 depicts exemplary software and hardware components within the conference phone in accordance with one aspect of the present application.

Before describing operations, the hardware and software of the conference phone 102 will now be described. Generally, the conference phone 102, as shown in FIG. 2, can have a processor 202 for implementing logic, a memory 204, a display 206, and an input device 208. A system bus 212 can be used for audio data as well as propagating signals for processing the audio. Fewer or more components can be used within the conference phone 102.

Beginning with the input device 208, a push button numeric dialing pad can be used, for example, those found on a typical telephone. The numeric dialing pad, which is commonly known, can include digits "0" through "9" along with letters of the English alphabet. A multi-key keyboard can also be used. Other types of input devices 208 can be used as well for inputting textual data. The input device 208, as shown in FIG. 1, can incorporate numerous other types of input keys, which will become apparent from the discussion provided below. The input device 208 can be connected to a serial input interface 210 where the input is processed and transferred over the bus 212.

With reference now to the memory 204, the conference phone 102 generally includes both volatile memory (e.g. RAM 214) and non-volatile memory (e.g. ROM 216, Flash Memory, or the like). The non-volatile portion of the memory 204 can be used to store persistent information which should not be lost when the conference phone 102 is powered down. Within the ROM 216, can be BIOS 218 for defining a firmware interface. The conference phone 102 can include an operating system (OS) 220, which can manage programs. The OS 220 can reside in the memory 204 and be executed on the processor 202.

The memory 204 can also include one or more device managers 222 for interacting with one or more I/O devices. The device managers 222 can be software installed on the conference phone 102. A device manager 222 can correspond to each I/O device. In addition to the device manager 222, an echo cancellation program 224 can be loaded into memory 204 and run on or in association with the OS 220. While described in the shown embodiment as software, echo cancellation can be implemented in software, hardware or both. Numerous implementations known to those skilled in the relevant art can be implemented within software and hardware for cancelling echoes.

Program data 226 within the memory 204 can be used to keep track of paired wireless devices 104. The program data 226 can be stored on RAM 214 or stored in a separate database. Information regarding the numerous paired wireless devices 104 can be stored within the program data 226. For example, information regarding passkeys issued can be stored in the program data 226. While passkeys are typical with pairing procedures, those skilled in the relevant art will appreciate that other types of connections and data transfers can be used between the wireless devices 104 and the conference phone 102.

In one embodiment, the conference phone 102 can be connected to a finite list of paired wireless devices 104 at any one time. Information about the paired devices 104 can be stored within the program data 226. When the maximum number of connected devices has been reached and a user attempts to connect a new wireless device 104, they can be prompted through the conference phone 102 to select a wireless device 104 to remove from a list of connected wireless devices 104.

While the memory 204, as shown, is provided on the conference phone 102, those skilled in the relevant art will appreciate that the memory 204 can be stored on a server, which can be accessed remotely. Those familiar with external data storage and retrieval will recognize the number of different possibilities for storing memory 204 outside the conference phone 102.

The conference phone 102 can have an array of microphones 228 built-in as with any standard conference phone 102. As shown in FIG. 2, the conference phone 102 can include three microphones 228. The microphones 228 can be equally spaced apart and used to capture audio from multiple angles. One or more microphones 228 can be used and is not limited to the shown embodiment.

The conference phone 102 can further include a wireless interface 230. The wireless interface 230 can be used to search for wireless devices 104 that are nearby. In one embodiment, only the inbound audio steam from the wireless device 104 is used by the conference phone 102. Typically, there is enough audio output provided by the conference phone speaker 236 for everyone in the room to hear the incoming audio regardless from where they are sitting.

The audio from the wireless devices 104 that are connected through the wireless interface 230 and the audio from the microphones 228 can be provided to the audio mixer 232. The audio mixer 232 can be implemented in software or hardware. Typically, the audio mixer 232, in its hardware form, includes operational amplifiers configured with a summer circuit. In one embodiment, the output of the audio mixer 232 can be amplified using an audio amplifier. In essence, the audio mixer 232 combines audio signal from multiple sources. The output from the audio mixer 232 can be sent to the bus 212 where it can be further processed by the echo cancellation program 224.

Generally, the conference phone 102 can include a display 206. The display 206 can be a liquid crystal display, or any other type of display 206 commonly used in conference phones 102. The display 206 can be connected to a display adapter 234. The display adapter 234 can receive information for display from the bus 212. In addition thereto, the conference phone 102 can incorporate a speaker 238. The speaker 238 can propagate incoming audio received from the telephone network 106. In one embodiment, audio received by the wireless devices 104 can be provided to the speaker 236. These communications can be provided over the bus 212.

For purposes of illustration, a set of examples will now be provided to show operations of the conference phone 102 along with the wireless device 104 extensions. These examples are given so that a general understanding of this application can be appreciated by those skilled in the relevant art. They should not be construed as limiting to the present application. The examples begin by showing processes for establishing a connection between wireless devices 104 and the conference phone 102. Continuing, the examples show a typical setup in conference calling.

Establishing Connections

Figure 3A:
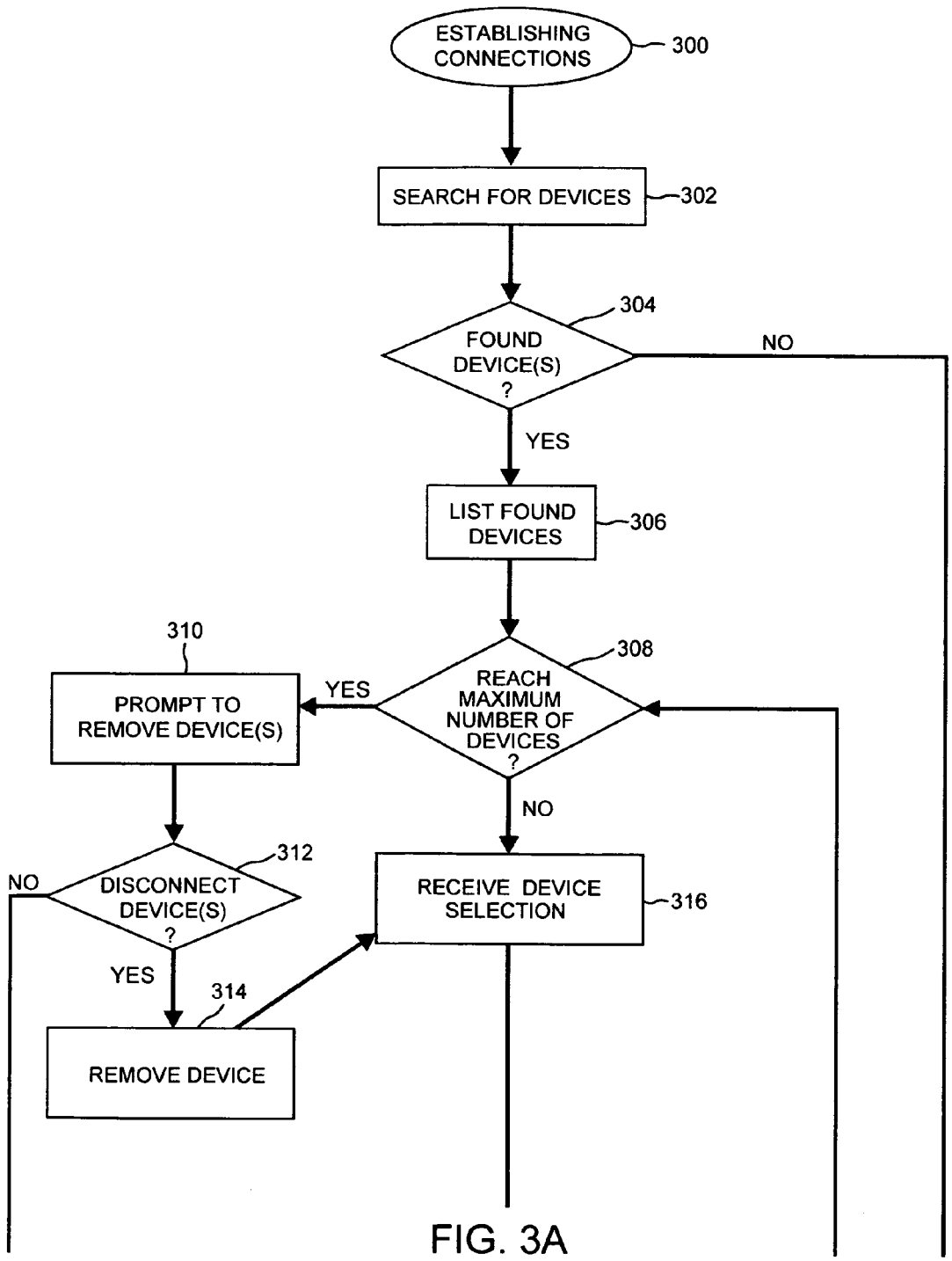
FIG. 3 provides a flow chart showing typical processes for connecting a wireless device with the conference phone in accordance with one aspect of the present application.
Figure 3B:
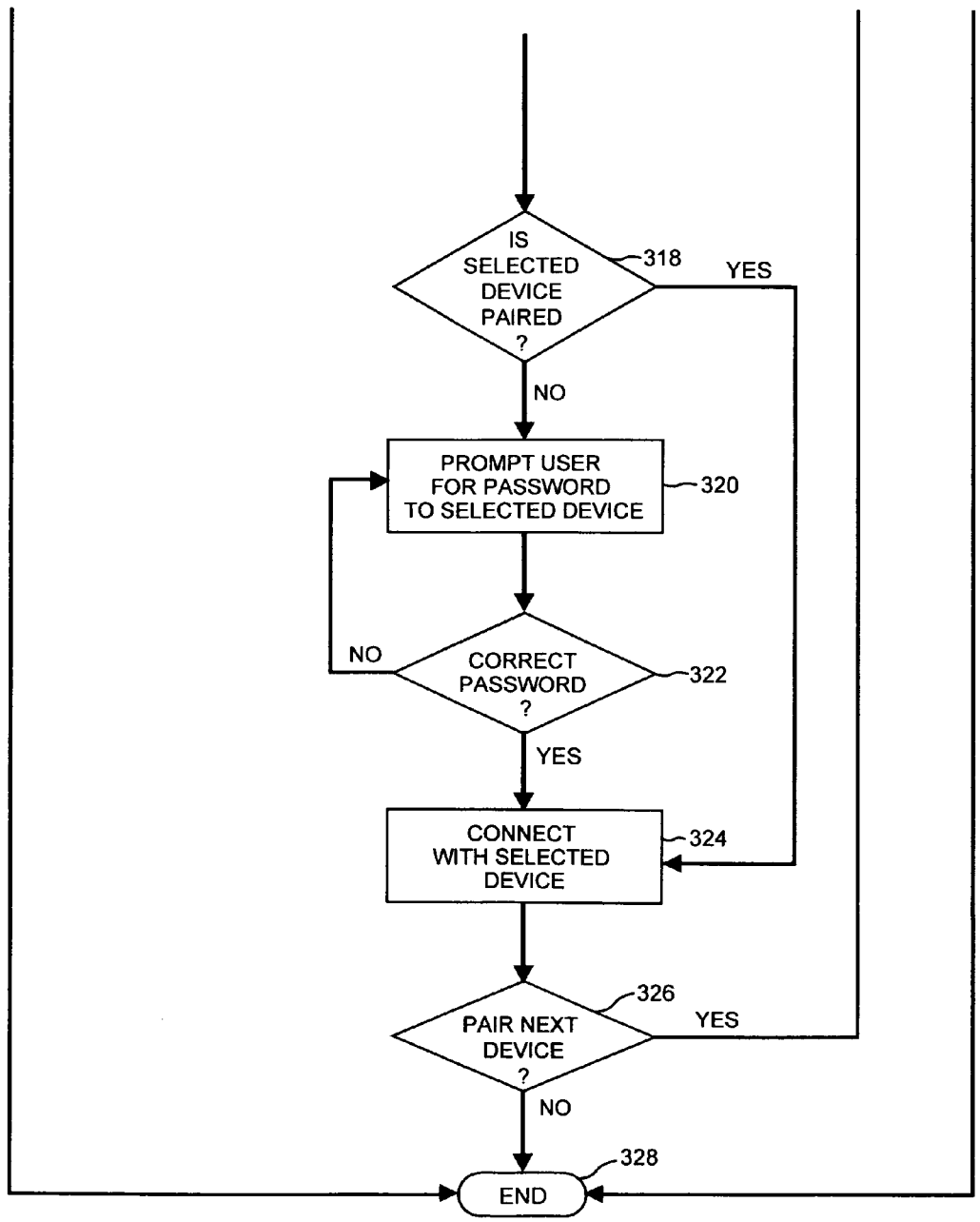

FIG. 3 provides a flow chart showing typical processes for connecting the wireless device 104 with the conference phone 102 in accordance with one aspect of the present application. While the processes are generally described for Bluetooth™ enabled devices, those skilled in the relevant art will appreciate that the flow chart can be manipulated to fit with different types of devices 104 such as cell phones, smart phones, laptops, etc.

Processes for connecting the wireless device 104 with the conference phone 102 can start at block 300. At block 302, the conference phone 102 can begin searching for devices 104. A button press on the input device 208, with either a physical button or menu selection within a GUI of the conference phone 102, can place the conference phone 102 in connecting mode where it searches for wireless devices 104 within range.

In one embodiment, the user of the wireless device 104 can press a button, which can make the wireless device 104 discoverable by the conference phone 102. Some wireless devices 104 do not have a button, but instead, when turned on, begin automatically connecting. At decision block 304, the conference phone 102 can determine if it has found any wireless devices 104 to connect with. When no devices 104 are found, the processes can end at block 328. The conference phone 102 can wait until the connecting button is pressed again.

When wireless devices 104 have been found, at block 306, the devices 104 can be listed on the display 206 of the conference phone 102. Information about the wireless device 104 can be provided including the user's name, number, etc. Typically, and as shown in FIG. 1, the display 206 is small. To accommodate large numbers of found wireless devices 104, input can be received by the input device 208 for scrolling up and down the list.

At decision block 308, a determination is made whether the maximum number of wireless devices 104 have been connected. In some embodiments of the conference phone 102, the number of connected wireless devices 104 can be limited. Information regarding the wireless devices 104 can be stored within memory 204, in particular, the program data 226. When the maximum number of wireless devices 104 have been connected, the user can be prompted to remove devices 104 at block 310. The display 206 can provide options that allow a user to remove connected wireless devices 104.

At decision block 312, the conference phone 102 can determine whether a request has been made to disconnect wireless devices 104. When no devices have been requested to be removed, and because the maximum number of devices 104 have been connected, the processes end at block 328. On the other hand, when a device 104 has been requested to be removed, the conference phone 102 can disconnect the wireless device 104 at block 314. More than one device 104 can typically be removed at any time. The processes can then be provided to block 316, which will be described below.

Returning to decision block 308, when the maximum number of wireless devices 104 have not been connected with the conference phone 102, and if more than one device 104 has been provided on the display 206, the conference phone 102 can receive input for a device 104 selection at block 316. When only one device 104 is found, by default, that device 104 is selected.

At decision block 318, the conference phone 102 determines whether the selected device 104 has already been paired. Typically, this can be performed by looking up information within the program data 226 discussed above. When the selected device 104 has been paired, the conference phone 102 can execute processes at block 324. When the wireless device 104 has not been paired, at block 320, the user can be prompted for a password to pair the selected wireless device 104. In many instances, the passcode is defaulted to "0000". They can accept the default passcode or enter a new passcode that matches the passcode for the wireless device 104.

At decision block 322, a determination is made whether the correct password was received from the user. When the incorrect password is received, the user can be prompted again for the password at block 320. In one embodiment, the processes can end at block 328 whereby the whole process would start again. When the password is correct, the conference phone 102 connects with the user of the selected wireless device 104 at block 324. This can be performed by sending a passkey to the wireless device 104. User information can be stored in the program data 226 of the conference phone 102.

In future connections, the wireless device 104 that has been paired can be recognized by the conference phone 102 so that the pairing procedures described above can be skipped. In this auto connect mode, pre-paired devices 104 are automatically connected when they are within range of the conference phone 102. In one embodiment, manual connections would be required by pressing a button on the device 104 or by going into a menu on the conference phone 102 and connecting the device 104 each time. Information can be stored within the program data 226 to help facilitate the recognition of pre-paired devices 104.

At decision block 326, a determination can be made whether any other users desire to connect their devices 104. The processes can return to decision block 308 where it can be checked if the maximum number of devices 104 have been connected. Otherwise, the processes for establishing connections can end at block 328. When a call is established on the conference phone 102, the user of the connected wireless device 104 can join the call by pressing a "talk" button on their wireless device 104.

While one method of connecting the user with the conference phone 102 was described, those skilled in the relevant art will appreciate that there are numerous ways for establishing the connection between the wireless device 104 and the conference phone 102. For example, the wireless device 104 can be connected with the conference phone 102 without going through the pairing process because the pairing information for their device 104 is already stored in a database that is accessible by the conference phone 102.

Conference Call

Figure 4:
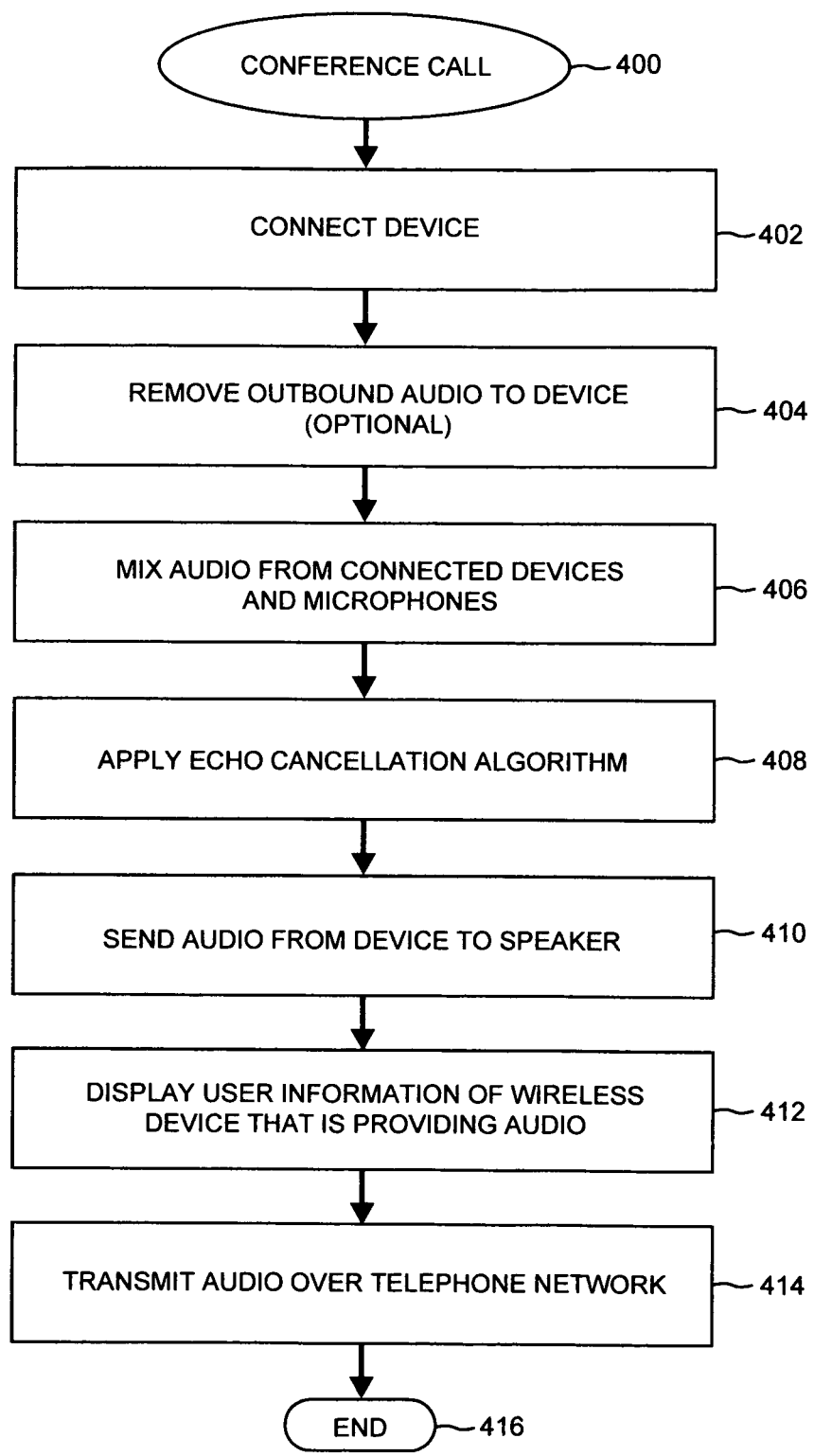
FIG. 4 illustrates processes for handling conference calls within the conference phone in accordance with one aspect of the present application.

Turning now to FIG. 4, processes for handling conference calls within the conference phone 102 in accordance with one aspect of the present application are provided. The processes can begin at block 400. Initially, the wireless device 104 can be connected with the conference phone 102 at block 402. Examples of connecting the wireless device 104 with the conference phone 102 were given above. Each connected wireless device 104 can be displayed on the conference phone 102.

At block 404, and in accordance with one embodiment, incoming audio can be removed by the conference phone 102 such that a user of the wireless device 104 would have to be close enough to the conference phone 102 to hear the incoming audio from the speaker 236. By preventing audio from being sent to the wireless devices 104, hackers can be stopped from entering into the teleconference.

In another embodiment, the conference phone 102 can support two-way communications between the conference phone 102 and the wireless devices 104. In large conference rooms, the incoming audio sometimes cannot be heard from the speaker 236 alone especially for those not near the conference phone 102. Utilizing those speakers 236 provided on the wireless device 104, users who are located far away from the conference phone 102 can properly hear the incoming audio.

The conference phone 102, in one embodiment, can determine the distance between the wireless device 104 and itself. By doing this, the conference phone 102 can decide whether to send incoming audio to the wireless device 104 or not.

At block 406, the audio from the connected devices 104 and microphones 228 on the conference phone 102 can be mixed. Mixing the audio typically results in a single audio stream from multiple sources. By generating a single output stream, the output from the connected devices 104 and microphones 228 can be processed. In one embodiment, before the audio from the wireless devices 104 is sent to the mixer 232, the audio received from the wireless devices 104 can be muted until a certain decibel level is reached. This can remove any audio that is not intended to be part of the conversation. Muting can take place on the wireless device 104 or conference phone 102.

In many instances, the single stream of audio provided by the audio mixer contains echoes. The echoing effect is a result of multiple microphones 228 picking up the same audio. At block 408, the echoing can be removed by well known algorithms stored in software 224 or hardware. In one embodiment, further distortions from the mixed audio can be removed. These distortions can result from timing delays, or other known disturbances.

At block 410, and in accordance with one embodiment, the audio received from the wireless devices 104 can be rebroadcast over the speaker 236 on the conference phone 102 so that parties near the conference phone 102 can listen to audio received from the wireless devices 104 around the conference room. While optional, this can be a valuable tool in teleconferencing. The conference phone 102 can remove feedback provided by the wireless devices 104.

In one embodiment, at block 412, user information regarding the wireless device 104 that is providing the incoming audio can be displayed. When incoming audio is detected by the conference phone 102, it can determine which wireless device 104 it is coming from. The conference phone 102 can look up information about the user of the wireless device 104 and then provide it on the display 206. This can be a valuable feature, as those who are near the conference phone 102 can determine who is speaking.

The audio can be transmitted over the telephone network 106 at block 414. The processes can end at block 416. The wireless device 104 can be connected to the conference phone 102 in the middle of a call or before the call is started.

Presence Detection

In one embodiment, the conference phone 102 can also be used to detect the presence of users within a conference. When connected using their wireless device 104, the location of a user can be determined. Collaboration applications can be used to retrieve that information and apply it to different situations. For example, a software application can receive information that the user of the wireless device 104 is in a conference call and should not be disturbed. The software application can then update the user's settings on their calendar. Those skilled in the relevant art will appreciate that numerous types of applications can be used that take advantage of the presence information.

Systems, Methods and Operations

In accordance with one aspect of the present application, a telecommunication device is provided. The telecommunication device can include a wireless interface, a microphone, a processor, and a memory operatively coupled to the processor. The memory can store program instructions that when executed by the processor, causes the processor to perform processes. These processes can include connecting with the wireless device through the wireless interface, receiving audio from the wireless device and the microphone, processing the audio, and transmitting the audio over a telephone network.

In one embodiment, the wireless interface can be set up for communicating with Bluetooth™ technologies. In one embodiment, the wireless device can be a headset. In one embodiment, the memory storing program instructions, when executed by the processor, causes the processor to limit a number of connected wireless devices. In one embodiment, the telecommunication device can further include a database for storing information about the wireless devices.

In one embodiment, connecting with the wireless device comprises receiving a password from the wireless device, confirming the wireless device through the password, and sending a passkey to the wireless device when confirmed. In one embodiment, the telecommunication device can further include a speaker. In one embodiment, the memory storing program instructions, when executed by the processor, causes the processor to route incoming audio from the telephone network to the speaker. In one embodiment, the memory storing program instructions, when executed by the processor, causes the processor to route incoming audio from the telephone network to the wireless device. In one embodiment, the memory storing program instructions, when executed by the processor, causes the processor to route the audio received from wireless device to the speaker.

In accordance with another aspect of the present application, a system is provided. The system can include a conference phone for transmitting communications. The communications can be provided by a wireless device connected with the conference phone and a receiver on the conference phone, the conference phone mixing the communications and cancelling echoes within the communications before transmitting the communications.

In one embodiment, the conference phone can include a key for pairing with the wireless device. In one embodiment, the wireless device can include a key for paring with the conference phone. In one embodiment, the conference phone can prevent incoming communications from being sent to the wireless device. In one embodiment, the conference phone can include a display for listing connected wireless devices. In one embodiment, the communications provided by the wireless device can be broadcasted over a speaker on the conference phone.

In accordance with yet another aspect of the present application, a method for enhancing participation within a conference call using a communication device is provided. The method can include connecting a headset with the communication device, receiving audio from the headset and a microphone associated with the communication device, processing the audio received from the headset and the microphone, and providing the audio to a telephone network.

In one embodiment, connecting the headset with the communication device can include determining whether a maximum number of headsets have been connected. In one embodiment, processing the audio can include combining the audio and cancelling echoes from the combined audio. In one embodiment, the method can further include receiving incoming audio and sending the incoming audio to a speaker on the communication device.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A telecommunication conference device comprising:
a wireless interface;
at least one microphone;
at least one processor; and
a memory operatively coupled to said processor, said memory storing program instructions that when executed by said processor, causes said processor to:
connect with at least one wireless device through said wireless interface, comprising,
  receiving a password from said at least one wireless device,
  confirming said at least one wireless device through said password, and
  sending a passkey to said at least one wireless device when confirmed;
receive audio from said at least one wireless device and said at least one microphone;
process said audio;
transmit said audio over a telephone network;
determine the distance to said at least one wireless device; and
one of either sending audio to said at least one wireless device or preventing audio from being sent to said at least one wireless device based on said distance.

2. The telecommunication device of claim 1, wherein said wireless interface is set up for communicating with Bluetooth™ technologies.

3. The telecommunication device of claim 1, wherein said at least one wireless device is a headset.

4. The telecommunication device of claim 1, wherein said memory storing program instructions, when executed by said processor, causes said processor to limit a number of connections to wireless devices.

5. The telecommunication device of claim 4, further comprising a database for storing information about said wireless devices.

6. The telecommunication device of claim 1, further comprising a speaker.

7. The telecommunication device of claim 6, wherein said memory storing program instructions, when executed by said processor, causes said processor to route incoming audio from said telephone network to said speaker.

8. The telecommunication device of claim 6, wherein said memory storing program instructions, when executed by said processor, causes said processor to route incoming audio from said telephone network to said at least one wireless device.

9. The telecommunication device of claim 6, wherein said memory storing program instructions, when executed by said processor, causes said processor to route said audio received from said at least one wireless device to said speaker.

10. A telecommunications system comprising:
a conference phone for transmitting communications;
wherein said communications are provided by at least one wireless device connected with said conference phone and at least one receiver on said conference phone, said at least one wireless device connected with said conference phone by (a) receiving a password from said at least one wireless device, (b) confirming said at least one wireless device through said password, and (c) sending a passkey to said at least one wireless device when confirmed, and
said conference phone (i) mixing said communications and cancelling echoes within said communications before transmitting said communications, (ii) determining the distance to said at least one wireless device, and (iii) one of either sending audio to said at least one wireless device or preventing audio from being sent to said at least one wireless device based on said distance.

11. The system of claim 10, wherein said conference phone comprises a key for pairing with said at least one wireless device.

12. The system of claim 10, wherein said at least one wireless device comprises a key for paring with said conference phone.

13. The system of claim 10, wherein said conference phone prevents incoming communications from being sent to said at least one wireless device.

14. The system of claim 10, wherein said conference phone comprises a display for listing connected wireless devices.

15. The system of claim 10, wherein said communications provided by said at least one wireless device is broadcasted over a speaker on said conference phone.

16. A method for enhancing participation within a conference call using a telecommunications conference device, said method comprising:
connecting at least one headset with said conference device by (a) receiving a password from said at least one headset, (b) confirming said at least one headset through said password, and (c) sending a passkey to said at least one headset when confirmed;
receiving audio from said at least one headset and a microphone associated with said conference device;
processing said audio received from said at least one headset and said microphone;
determining the distance to said at least one headset; and
one of either sending audio to said at least one headset or preventing audio from being sent to said at least one headset based on said distance.

17. The method of claim 16, wherein connecting said at least one headset with said conference device comprises determining whether a maximum number of headsets have been connected.

18. The method of claim 16, wherein processing said audio comprises combining said audio and cancelling echoes from said combined audio.

19. The method of claim 16, further comprising receiving incoming audio and sending said incoming audio to a speaker on said conference device.

* * * * *